Figure 1:
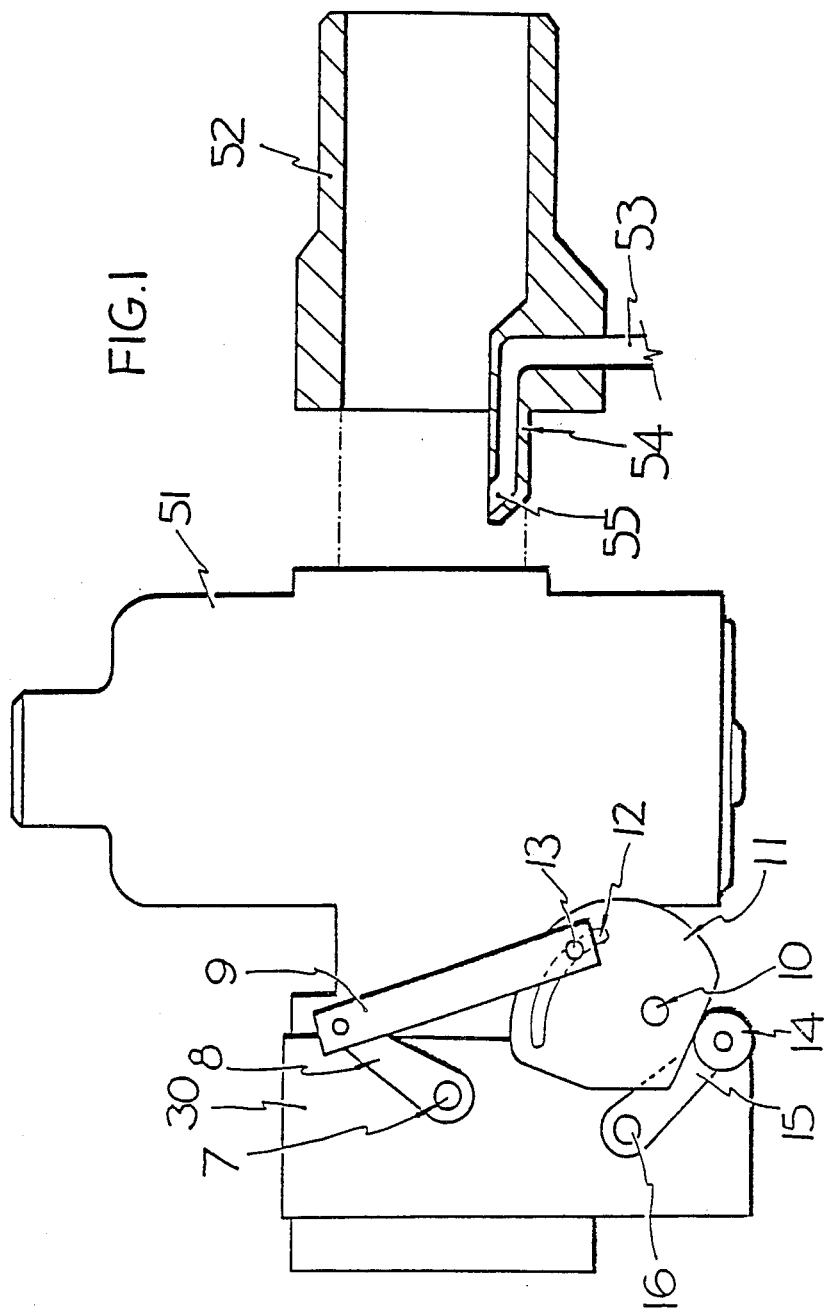

United States Patent [19]

Bennett

[11] Patent Number: 4,879,975
[45] Date of Patent: Nov. 14, 1989

[54] ALCOHOL FUEL OPERATION CONVERSION MEANS FOR INTERNAL COMBUSTION ENGINES

[75] Inventor: John R. McC. Bennett, Melbourne, Victoria, Australia

[73] Assignee: Bennett Automotive Technology Pty., Ltd., Victoria, Australia

[21] Appl. No.: 175,043

[22] PCT Filed: May 21, 1987

[86] PCT No.: PCT/AU87/00142
 § 371 Date: Jan. 19, 1988
 § 102(e) Date: Jan. 19, 1988

[87] PCT Pub. No.: WO87/07332
 PCT Pub. Date: Dec. 3, 1987

[51] Int. Cl.$^4$ ............................................. F02B 31/00
[52] U.S. Cl. ................................. 123/52 M; 123/543; 123/437
[58] Field of Search ....... 123/52 M, 52 MB, 52 MV, 123/52 MC, 546, 549, 543, 190 A, 437

[56] References Cited

U.S. PATENT DOCUMENTS

| | | | |
|---|---|---|---|
| 4,254,747 | 3/1981 | Sumiyoshi et al. | 123/52 M |
| 4,276,862 | 7/1981 | Matsumoto | 123/52 M |
| 4,300,504 | 11/1981 | Tezuka | 123/52 M |
| 4,318,380 | 3/1982 | Matsumoto | 123/52 M |
| 4,625,687 | 12/1986 | Hatamura et al. | 123/52 M |
| 4,714,063 | 12/1987 | Oda et al. | 123/308 |

FOREIGN PATENT DOCUMENTS 0054661 4/1980 Japan ............................. 123/52 MB Primary Examiner—David A. Okonsky
Attorney, Agent, or Firm—Dorsey & Whitney

[57] ABSTRACT

A modified carburetion and manifold arrangement to enable internal combustion engines to efficiently use fuels such as alcohols having high latent heat of vaporization. A variable venturi carburetion means (30) is combined with two manifolds-one (20) being larger for use during medium to high power operation and a second smaller manifold (24) for starting and low power operation.

15 Claims, 3 Drawing Sheets

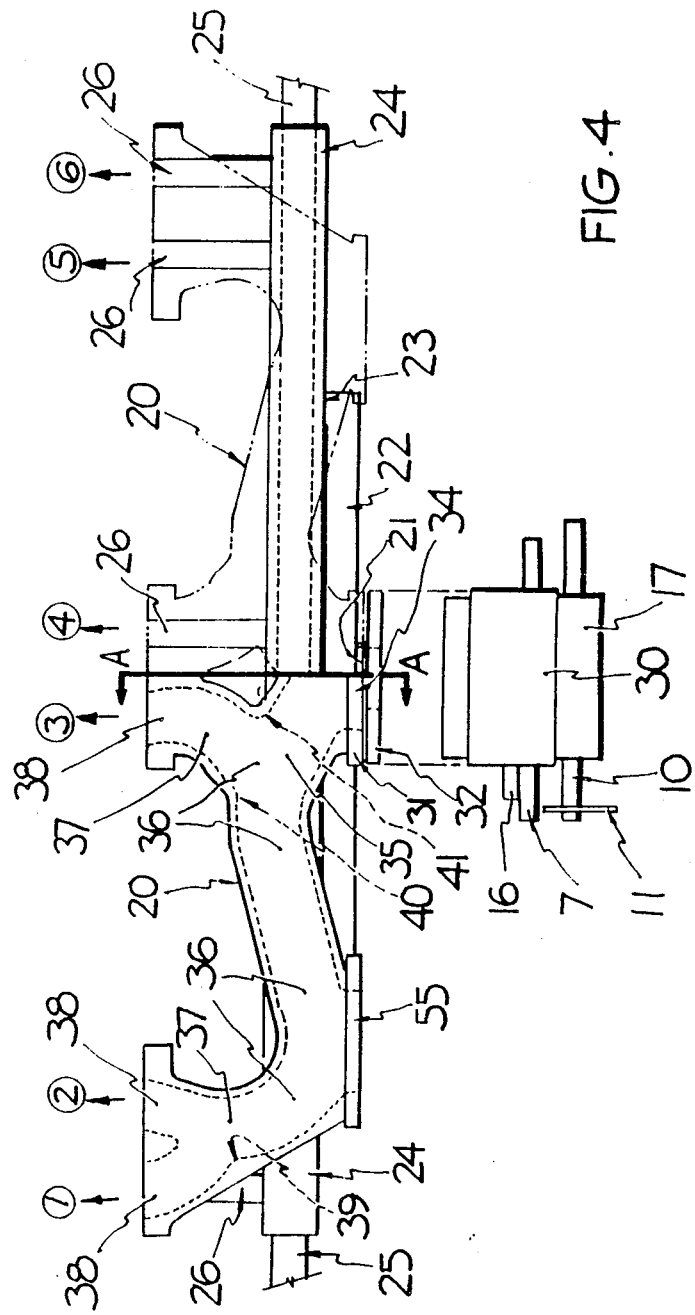

ALCOHOL FUEL OPERATION CONVERSION MEANS FOR INTERNAL COMBUSTION ENGINES

The invention concerns means by which automotive piston internal combustion engines may be converted to operate on ethanol and methanol fuel.

Following the Oil Shock of 1973, considerable experimentation was undertaken into the use of alcohol fuels as fuel extenders or as fuels in their ownright. In countries where organic feedstocks can be successfully grown in large quantities for the production of ethanol, or where natural gas is readily available for conversion into methanol, the use of alcohol fuels is well established.

In most cases, engines converted to alcohol fuel operation were originally manufactured to operate on gasoline. As a result of deficiencies in the conversion method, the operation of converted vehicles is often less than satisfactory. Disabilities experienced in alcohol-fuelled engines are: difficulty in starting, stumbling and rough running when cold, stalling due to carburettor icing after operating at low power, excessive emissions and generally poor fuel economy. Attempts have been made to rectify the starting and cold running problems by changing to an alternative supply of gasoline before stopping the engine, the starting and running the engine on the reserve supply of gasoline until it reaches operating temperature.

The present invention aims generally to provide a means of converting a gasoline powered automotive engine to alcohol fuel operation in such a way as to eliminate or minimise the abovementioned operating problems. More particularly the present invention aims at providing improvements in various aspects of engine design which are intended to achieve improved engine performance when using alcohol or alcohol based fuels and which can be used independently or in combination.

In accordance with a first aspect of the present invention there is provided a caburetion and manifolding means to allow the efficient operation of piston internal combustion engines on fuels having a high latent heat of vaporisation such as ethanol and methanol, comprising a variable venturi type carburetion means, a first and larger manifolding means to be used during medium to high power operation, and a second and smaller manifolding means to be used during starting, idling and low power operation. Conveniently said improvement comprises providing passage means discharging said filtered heated air immediately upstream of the fuel discharge orifice. Preferably, the filtered heated air is heated by exhaust gases from said engine.

According to a preferred aspect of the present invention a butterfly valve is provided to regulate the flow of fuel-air mixture through the said first and larger inlet manifolding means, the flow of fuel-air mixture through the said second and smaller inlet manifolding means being taken off from a point upstream of the said butterfly valve and thence regulated by a barrel type valve, the operating means of which are sequentially linked to the operating means of the said butterfly valve. In accordance with a preferred embodiment, the auxiliary manifold distribution arrangement includes means for preheating the fuel/air charge passing there through. To achieve this heating, a transversely extending section of the auxiliary manifold distribution arrangement is provided with passage means in heat exchange relationship therewith adapted to pass fluid from the engine cooling system, conveniently the thermostat bypass circuit.

Preferably an electrically operating auxiliary heating means may be provided upstream of the secondary throttle means adapted to heat and assist in vapouring fuel only during engine start up.

According to a further aspect of the present invention there is provided a manifold arrangement for induction of a fuel/air charge into a six cylinder engine, wherein the said first and larger inlet manifolding means is made with a circular entry opening in area one unit, leading to runners of an internal rectangular shape, a smooth transition from circular to rectangular shape occurring between the said inlet opening and the branching of the separate runners for cylinders 3 and 4, height of the said runners being constant throughout the said manifolding means at 65% of the diameter of the said inlet opening and width of the said runners decreasing smoothly such that the cross-section area of the said runners is 57% of the area of the said inlet opening at the point of branching of the separate runners to cylinders 3 and 4, 51% of the area of the said inlet opening at a point mid-way between the point of the preceding dimension and the point of branching of the separate runners to cylinders 1 and 2 and 5 and 6, 46% of the area of the said inlet opening at the said point of branching of the said separate runners to cylinders 1 and 2 and 5 and 6, 41% of the area of the said inlet opening at the point where the separate runners to all cylinders debouch into their respective cylinder head inlet ports.

Conveniently, wherein the said round inlet opening leads to two first short runners in which the said smooth transition to a rectangular internal cross-sectional shape occurs, the general axis of the said first runners making an angle of 60 degrees with a reference plane normal to the longitudinal axis of the engine on which the said manifolding means is mounted, and the axes of the said separate runners to cylinders 3 and 4 being more or less normal to the axes of the two said first short runners and converging to make an angle of 30 degrees with the said reference plane before turning finally to parallel the said reference plane at the point of entry to their said respective cylinder head inlet ports; and at a point immediately downstream of the points of branching of the said separate runners to cylinders 3 and 4, the said manifolding means recurves through 45 degrees to provide two more or less straight long second runners which, at a point approaching a point adjacent the cylinder head inlet ports for cylinders 2 and 5, join two shorter curving third runners which turn towards the engine through 105 degrees and bifurcate into the separate runners respectively for cylinders 1 and 2 and 5 and 6, the said separate runners to cylinders 1 and 6 diverging outwards from the said reference plane at 15 degrees before turning finally to parallel the said reference plane at the point of entry to their said respective cylinder head inlet ports and the said separate runners to cylinders 2 and 5 diverging inward at an angle of 30 degrees to the said reference plane before turning finally to parallel the said reference plane at the point of entry to their said respective cylinder head inlet ports.

Figure 2:
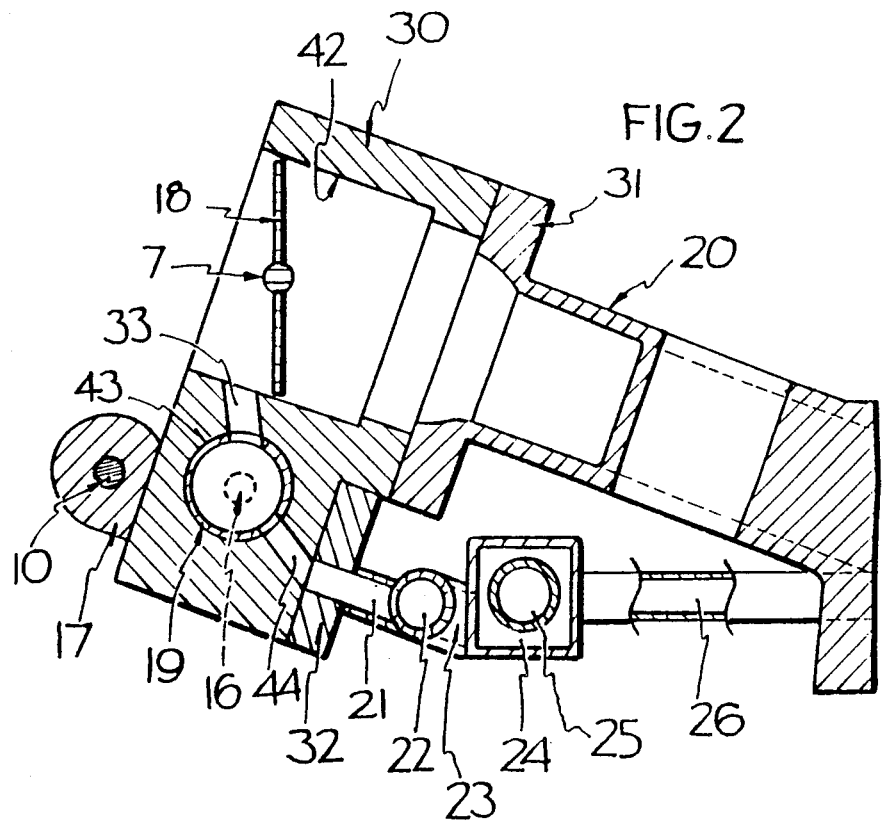
Figure 3:
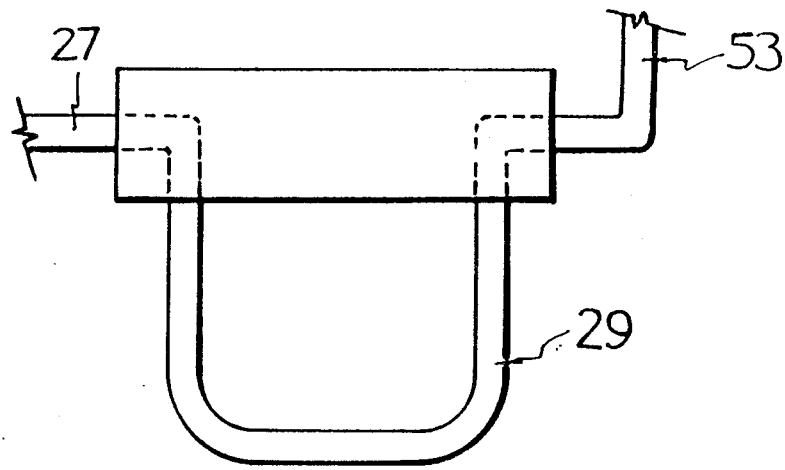

The present invention will be more readily understood by reference to the following description of preferred embodiments given in relation to the accompanying drawings, in which:

FIG. 1 combines a side view of a carburettor and throttle block upon which it is mounted, showing the throttle actuating mechanism, and a longitudinal sectional view of an air horn connected to the carburettor;

FIG. 2 is a transverse sectional view along line A—A of FIG. 4, of the throttle block upon which the carburettor is mounted, the main inlet manifold and the auxiliary inlet manifold;

FIG. 3 is a side view of the arrangement of a means of providing a supply of heated air to the air horn fixed to the carburettor; and FIG. 4 is a plane view of a main inlet manifold and throttle block in which the internal shaping of the left hand half of the main inlet manifold is shown in broken line, and in which the right hand half has been removed, its outline being shown in broken line, revealing the arrangement of the auxiliary inlet manifold beneath it.

With reference to FIG. 1, variable venturi carburettor 51 is preferably of the SU type, the operating principle of which is well-known in the art. Air horn 52 is fixed to the intake opening of the said carburettor, said air horn being made with an extension part 54 which projects into the said carburettor opening and abuts the raised bridge in which is situated the fuel discharge orifice. Said extension part is provided with a duct 55 which discharges a flow of filtered air heated by the exhaust gas stream of the engine immediately upstream of the carburettor discharge orifice.

With reference to FIG. 3, air from the engine air cleaner enters an air heater loop 29 through pipe 27, passing to duct 55 in air horn 52 via pipe 53. Said air heater loop projects into the engine exhaust stream at a suitable location in the exhaust manifold or exhaust pipe and may embody one or more coils if additional surface is required. Pipe 53 is lagged with an insulating covering if it is if any length.

With refernece to FIG. 2, said carburettor, from which the throttle butterfly valve has been removed, is mounted upon throttle block 30 which is provided with throttle butterfly valve 18 carried upon spindle 7. Said throttle block is fixed to the carburettor mounting flange 31 of a replacement main inlet manifold 20. Immediately upstream of the said throttle butterfly valve, in the floor of duct 42 in the said throttle block in which the said throttle butterfly valve is accommodated, is located diversion port 33. Said diversion port passes downward to barrel valve 19 carried upon spindle 16 and accommodated in bore 43 in the lower part of the said throttle block. With throttle butterfly valve 18 closed, atmospheric pressure causes a flow of fuel-air mixture down diversion port 33, through the said barrel valve, through duct 44, through the opening in flange 32, through short duct 21 to short longitudinal runner 22. The ends of the said short longitudinal runner are joined to auxiliary inlet manifold runner 24 at the mid points of each of its half lengths by means of short ducts 23. Said auxiliary inlet manifold runner is made with heating duct 25 inside it passing along its length, said heating duct being incorporated into the engine cooling system thermostat bypass circuit. Connecting the said auxiliary inlet manifold runner to the base of each of the openings of the inlet ports in the engine cylinder head on ducts 26. Main throttle operating spindle 10 is accommodated in a bore in an extension 17 of the said throttle block.

With reference to FIG. 4, throttle block 30 is fixed to carburettor mounting flange 31 of main inlet manifold 20 and flange 32 of the said auxiliary inlet manifold. Duct 21 joins the said auxiliary inlet manifold flange to short longitudinal runner 22, the ends of which are joined by short ducts 23 to the mid points of each half length of the said auxiliary inlet manifold runner. Heating duct 25 enters at one end of the said auxiliary inlet manifold runner, passing along its length to emerge at the other end. The said auxiliary inlet manifold runner is joined to the lower opening of each inle port in the engine cylinder head by ducts 26. In the main inlet manifold, that depicted being for a six cylinder engine, entry opening 34 is made 43 mm in diameter, the internal cross-sectional shape of the said manifold transitioning smoothly from the said circular entry to a rectangular shape by the commencement of the first runner junction. The internal cross-sectional shape of the remainder of the said main inlet manifold runners is rectangular with a vertical dimension of 29 mm and with the corners filled with a fillet of 4.5 mm radius. The width of the said inlet manifold runners is: at point 35, 32 mm; points 36, 28 mm; points 37, 26 mm; points 38, 23 mm. In an alternative embodiment of the main inlet manifold made for greater power output, entry opening 34 is made 51 mm in diameter and the vertical internal dimension of the runners is made 36 mm. Carburettor mounting flanges 55 are provided for twin carburettors, their entry openings in the preferred embodiment being 38 mm in diameter. The volume of fuel-air mixture distributed to each cylinder in a particular engine type is tuned by slightly modifying shapes 39, 40 and 41. With reference to a plane normal to the longitudinal axis of the said inlet manifold, the main inlet manifold runners to cylinders two and five are curved inward by approximately thirty degrees, the runners to cylinders one and six diverging from them by approximately fortyfive degrees. The runners to cylinders three and four diverge from the entry runner by approximately ninety degrees. The said main inlet manifold is fixed to the said cylinder head inn a metal to metal contact to promote its heating.

With reference to FIGS. 1 and 4, throttle butterfly valve spindle 7 is operated by lever arm 8 which is pivotally attached to link 9, the other end of which carries pin 13 engaged in curved slot 12 on cam plate 11. Cam plate 11 is carried on spindle 10, the other end of which carries the main throttle operating lever arm (not shown). Barrel valve operating spindle 16 is operated by lever arm 15, on the outer end of which is carried roller 14, said roller being held in contact with the edge of camplate 11 by a suitable spring (not shown). In operation, initial movement of the said main throttle operating lever arm causes cam plate 11 to rotate, roller 14 coacting with its edge displacing lever arm 15 and rotating spindle 16 to progressively open the said barrel valve and admit an increased flow of fuel-air mixture to the said auxiliary inlet manifold. Pin 13 rides in slot 12, having no effect upon the position of throttle butterfly valve spindle 7 until rotation of complete 11 causes pin 13 to contact the end of slot 12. Further rotation of spindle 10 then causes the said throttle butterfly valve to be progressively opened.

Where starting proves to be a problem, provision is made for a small electric heating coil to be exposed to the flow of fuel-air mixture immediately upstream of the diversion port depicted as 33 in FIG. 2. Said heating coil is provided with electrical current through the engine ignition switch, said current being interrupted by a thermostatic switch referencing the temperature of pipe 53 depicted in FIGS. 1 and 3.

The claims defining the invention are as follows:

1. A carburetion and manifolding arrangement to allow the efficient operation of a six-cylinder internal combustion engine on fuels having a high latent heat of vaporisation such as ethanol and methanol comprising a variable venturi type carburetion means, a first and larger inlet manifolding means to be used during medium to high power operation, and a second and smaller inlet manifolding means to be used during starting, idling and low power operation wherein the first and larger inlet manifolding means leads to a respective cylinder-head inlet port for each cylinder and is made with a circular central entry opening having a predetermined area, leading by branching to a separate runner of an internal rectangular cross-sectional shape for each cylinder, a smooth transition from circular to rectangular shape occurring between the entry opening and a branching point of the separate runners for cylinders 3 and 4, the height of the runners being constant throughout the first and larger manifolding means at 65% of the diameter of the entry opening and the width of the runners decreasing smoothly such that the cross-sectional area of the runners is 57% of the area of the entry opening at the branching point of the separate runners to cylinders 3 and 4, 51% of the area of the entry opening at a point mid-way between the branching point of the separate runners to cylinders 3 and 4 and a branching point of the separate runners to cylinders 1 and 2 and 5 and 6, 46% of the area of the entry opening at the branching point of the separate runners to cylinders 1 and 2 and 5 and 6, and 41% of the area of the entry opening at each point where the separate runners to all cylinders debouch into their respective cylinder head inlet ports.

2. A manifolding arrangement in accordance with claim 1 wherein the engine has a longitudinal axis and the circular entry opening leads to two first short runners in which the smooth transition to a rectangular internal cross-sectional shape occurs, the general axis of the first short runners making an angle of 50 degrees with a reference plane normal to the longitudinal axis of the engine on which the first and larger manifolding means is mounted, and the axes of the separate runners to cylinders 3 and 4 being substantially normal to the axes of the two first short runners and converging to make an angle of 30 degrees with the reference plane before turning finally to parallel the reference plane at the point of entry to their respective cylinder head inlet ports and at a point immediately downstream of the points of branching of the separate runners to cylinders 3 and 4, the first and larger manifolding means recurves through 45 degrees to provide two substantially straight long second runners which, at a point approaching a point adjacent the cylinder head inlet ports for cylinders 2 and 5, join two shorter curving third runners which turn towards the engine through 105 degrees and bifurcate into the separate runners respectively for cylinders 1 and 2 and 5 and 6, the separate runners to cylinders 1 and 6 diverging outwards from the reference plane at 15 degrees before turning finally to parallel the reference plane at the point of entry to their respective cylinder head inlet ports and the separate runners to cylinders 2 and 5 diverging inward at an angle of 30 degrees to the reference plane before turning finally to parallel the reference plane at the point of entry to their respective cylinder head inlet ports.

3. A manifolding arrangement in accordance with claim 2 wherein circular inlet openings are provided for the mounting of dual carburetion means, said dual carburetion inlet openings being situated at each point where the substantially straight long second runners join the shorter curving third runners, said dual carburetion means inlet openings being covered by blanking plates when the central entry opening is in use and vice versa, the diameter of the dual carburetion means inlet openings being made approximately 84% of the diameter of the central entry opening.

4. A manifolding arrangement in accordance with claim 3 wherein prominences are provided on internal walls of the first and larger inlet manifolding means adjacent both sides of the point of branching of the separate runners to cylinders 3 and 4 and on the outer side of the point of branching of the separate runners to cylinders 1 and 6, the height and shape of the prominences being modifiable to provide a fine adjustment of the distribution of fuel-air mixture to individual cylinders.

5. A replacement carburetion and manifolding means adapted to replace an existing carburetion and manifolding means to enable efficient operation of a reciprocating internal combustion engine on fuels having high latent heat of vaporization such as ethanol and methanol, said replacement carburetion and manifolding means comprising:
 a variable venturi carburettor adapted to supply a fuel/air mixture to the manifolding means for said engine;
 an air intake means for said carburettor arranged to supply a main stream of air to said carburettor;
 secondary air supply means leading a secondary stream of heated filtered air to a position adjacent to a discharge orifice of said carburettor leading to said manifolding means, and
 said manifolding means comprising a first larger inlet manifold to be used during medium to high power operation of the engine, and
 a second and smaller inlet manifold to be used during starting, idling and lower power operation.

6. A replacement carburetion and manifolding means according to claim 5, wherein said secondary air supply means leads said secondary air stream to a position immediately upstream of said discharge orifice of the carburettor.

7. A replacement carburetion and manifolding means according to claim 5, wherein said secondary air stream is heated by heat exchange with exhaust gases of said engine.

8. A replacement carburetion and manifolding means in accordance with claim 5, wherein a first valve is provided to regulate flow of the fuel/air mixture from the carburettor to the first inlet manifold, a second valve is provided to regulate flow of the fuel/air mixture from the carburettor to the second inlet manifold, the flow of the fuel/air mixture to the second inlet manifold being taken from the flow of fuel/air mixture of the first inlet manifold at a position upstream of the first valve, operating means for said first and second valves being operationally linked whereby during start up and the idle when said first valve is initially closed, said second valve is progressively opened to supply fuel/air mixture via said second inlet manifold prior to said first valve opening progressively from an off, idle condition of operation by which time said second valve is fully open.

9. A replacement carburetion and manifolding means according to claim 8, wherein said first valve is a butterfly valve and said valve is barrel type valve, rotation of said first and second valves to effect opening or closing thereof being effected by interconnected link and/or cam means operable by a single throttle control member.

10. A replacement carburetion and manifolding means according to claim 8, wherein the flow of fuel/air mixture to the second inlet manifold is heated by auxiliary heating means located between the first valve and the carburettor upstream of the position where said fuel/air mixture flowing to said second inlet manifold is taken from the fuel/air mixture flowing towards said first inlet manifold, said auxiliary heating means being operable during start up of the engine and being inoperable once the secondary stream of heated filtered air reaches a predetermined temperature.

11. A replacement carburetion and manifolding means according to claim 8, wherein said first inlet manifold includes a first passage leading from said first valve into a first longitudinal runner with a plurality of first branch passages spaced along said longitudinal runner ending in first inlet manifold ports, said second inlet manifold comprising a second passage leading from said second valve to a second longitudinal runner arrangement with second branch passages spaced along said second longitudinal runner arrangement ending in second inlet manifold ports, each said second inlet manifold port being located in a base region of a respective one of said first inlet manifold ports whereby both said first and second inlet manifold ports are arranged, when installed, to communicate with inlet ports of said engine.

12. A replacement carburetion and manifolding means according to claim 11, wherein the first passage enters said first longitudinal runner midway along its length.

13. A replacement carburetion and manifolding means according to claim 11 or claim 12, wherein said second longitudinal runner arrangement comprises a first runner duct and a second runner duct, said second passage entering said first runner duct midway along its length with said first runner duct communicating with said second runner duct at spaced locations, said second runner duct including means for heating the fuel/air mixture flowing therethrough.

14. A replacement carburetion and manifolding means according to claim 13, wherein the means for heating the fuel/air mixture in said second runner duct comprises piping means led through said second runner duct adapted to carry a heated fluid or gas.

15. A replacement carburetion and manifolding means according to claim 14, wherein the piping means forms part of the engine coolant circulation system.

* * * * *